Figures 1, 2:
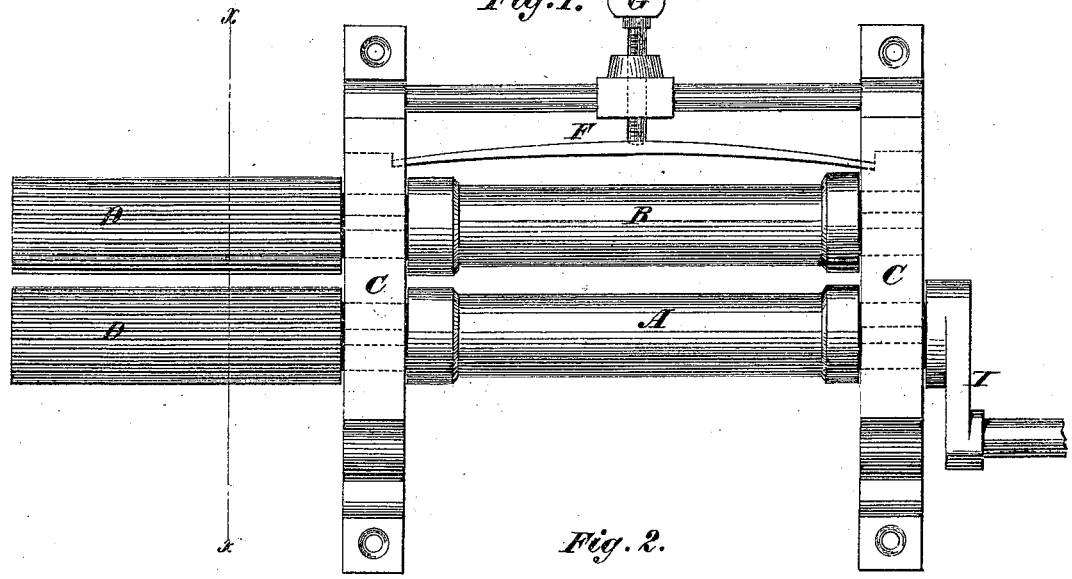

E. ATKINS.
Improvement in Beef-Steak Choppers.

No. 128,997. Patented July 16, 1872.

Witnesses:
Francis McArdle
N. A. Graham

Inventor:
Mrs. E. Atkins
per Munn & Co.
Attorneys.

No. 128,997

UNITED STATES PATENT OFFICE.

ELIZABETH ATKINS, OF MONROE, LOUISIANA.

IMPROVEMENT IN BEEFSTEAK-CHOPPERS.

Specification forming part of Letters Patent No. 128,997, dated July 16, 1872.

Specification describing a new and Improved Beefsteak-Chopper, invented by Mrs. ELIZABETH ATKINS, of Monroe, in the parish of Ouachita and State of Louisiana.

My invention consists of a pair of rollers or cylinders with acute angular flutes arranged horizontally in the same plane for rolling together, one being turned by a crank with a clearer or discharger below for preventing the meat from being carried around with the rollers. One of said rollers is adjustable toward and from the other, and provided with an adjusting-screw and a spring for allowing it to be self-adjusting to some extent as the meat varies in thickness or resistance to said rollers. The fluted portions overhang the housings, so that the bones in the meat may be guided along the ends while the meat passes between them. The steak is presented to said rollers by suspending it by the hand above and between them.

Figure 1 is a plan view of my improved steak-chopper, and Fig. 2 is a sectional elevation taken on the line $x\ x$ of Fig. 1.

Similar letters of reference indicate corresponding parts.

A and B represent a pair of cylinders or rollers mounted in the housings C, horizontally side by side in the same plane with fluted parts D, projecting beyond said housings at one side about as far as the greatest width of a large beefsteak. These flutes are in the form of acute angles and about a quarter of an inch high, but they may be more or less high, as preferred. The bearing-blocks E of roller B are capable of moving laterally in the housings, and a spring, F, and adjusting-screw G are arranged therewith, for confining it against the center bearings H with more or less force, so that it will move backward from the other roller more or less according to the thickness of the steak and its resistance to the cutters. Roller A is provided with a hand-crank, I, for turning it; the other roller will be turned by the action of the meat upon it. K is a clearer or discharger, consisting of an arm or fixed scraper projecting from the housings outward along under the roller A, in such close proximity as to scrape off or otherwise detach the meat coming against it from the roller and prevent it from being carried around on the roller to which it will adhere with considerable tenacity. I will also have a discharger with the other roller, if required, and in this case will attach it to the movable bearing E, so that it will move back and forth with roller B.

It will be seen that a chopper of this character will be far more efficient and uniform in its operation than the common mode of chopping by hand is.

The rollers might be arranged one above another, but this would require a feeding-table, on which to lay the steak in the right position for being presented to the rollers, and then it would have to be pushed along by hand. This table would have to be so long as to add materially to the space the machine would occupy. It would also add to the expense of the machine, and the steak would have to be so adjusted on it that the bones would have to overhang the outer edge in order to pass along the ends of the rollers, or else an extension of the table beyond said rollers in a little lower plane than the principal part would have to be provided, and the bones so overhanging would interfere materially with the feeding of the steak; whereas in feeding it from above downward it can be guided for passing the bones along the ends of the rollers with the greatest exactness, by simply moving the hand laterally, as required, while lowering the steak to the rollers.

My improved steak-chopping machine differs from the machines of this character used for fluting cloth, in that the rollers are arranged in the same horizontal plane, the flutes are sharper and finer, and do not mesh with each other when performing work, and a scraper or discharger is used with either one or both of the rollers.

Having thus described my invention, I claim as new and desire to secure by Letters Patent—

The combination, in a meat-chopper, of a pair of fluted rollers, the housings and bearings therefor, a tension-spring, adjusting-screw, one or more dischargers, and a hand-crank, the said rollers, which overhang the housings in the fluted portions, being arranged in the same horizontal plane and all being adapted for the requirements of a steak-chopper, substantially as specified.

ELIZABETH ATKINS.

Witnesses:
W. H. GAYLE,
D. B. TROMDALE.